United States Patent
Ferrentino et al.

[11] 3,937,559
[45] Feb. 10, 1976

[54] OPTICAL FIBER CABLE

[75] Inventors: Antonio Ferrentino; Germano Beretta, both of Monza (Milan), Italy

[73] Assignee: Industrie Pirelli S.p.A., Milan, Italy

[22] Filed: May 1, 1974

[21] Appl. No.: 465,827

[30] Foreign Application Priority Data
May 23, 1973   Italy................................ 24442/73

[52] U.S. Cl. ....... 350/96 WG; 156/179; 174/117 F; 350/96 B
[51] Int. Cl.² ........................................... G02B 5/16
[58] Field of Search ... 350/96 B, 96 WG; 174/70 R, 174/115, 117 F

[56]  References Cited
UNITED STATES PATENTS
| | | | |
|---|---|---|---|
| 3,050,907 | 8/1962 | Hicks, Jr. et al. | 350/96 B X |
| 3,272,063 | 9/1966 | Singer, Jr. | 350/96 B |
| 3,430,057 | 2/1969 | Genahr | 350/96 B X |
| 3,571,613 | 3/1971 | Plate et al. | 174/115 X |

Primary Examiner—John K. Corbin
Attorney, Agent, or Firm—Brooks Haidt Haffner & Delahunty

[57] ABSTRACT

An optical fiber band comprising a pair of thermally sealed thermoplastic films with a plurality of optical fibers in side-by-side relation and following undulate paths embedded therebetween, and a telecommunication signal cable formed by winding a plurality of such bands around an insulated metal rope. The thermoplastic films and the fibers are fed between rollers or cylinders while the fibers are undulated. The films are heated to their softening temperature on at least parts of their facing surfaces prior to reaching the cylinders. The films may each be composite films of different temperature characteristics or may be wider than the final band, heated only at their central portions and then trimmed to the final band size.

9 Claims, 3 Drawing Figures

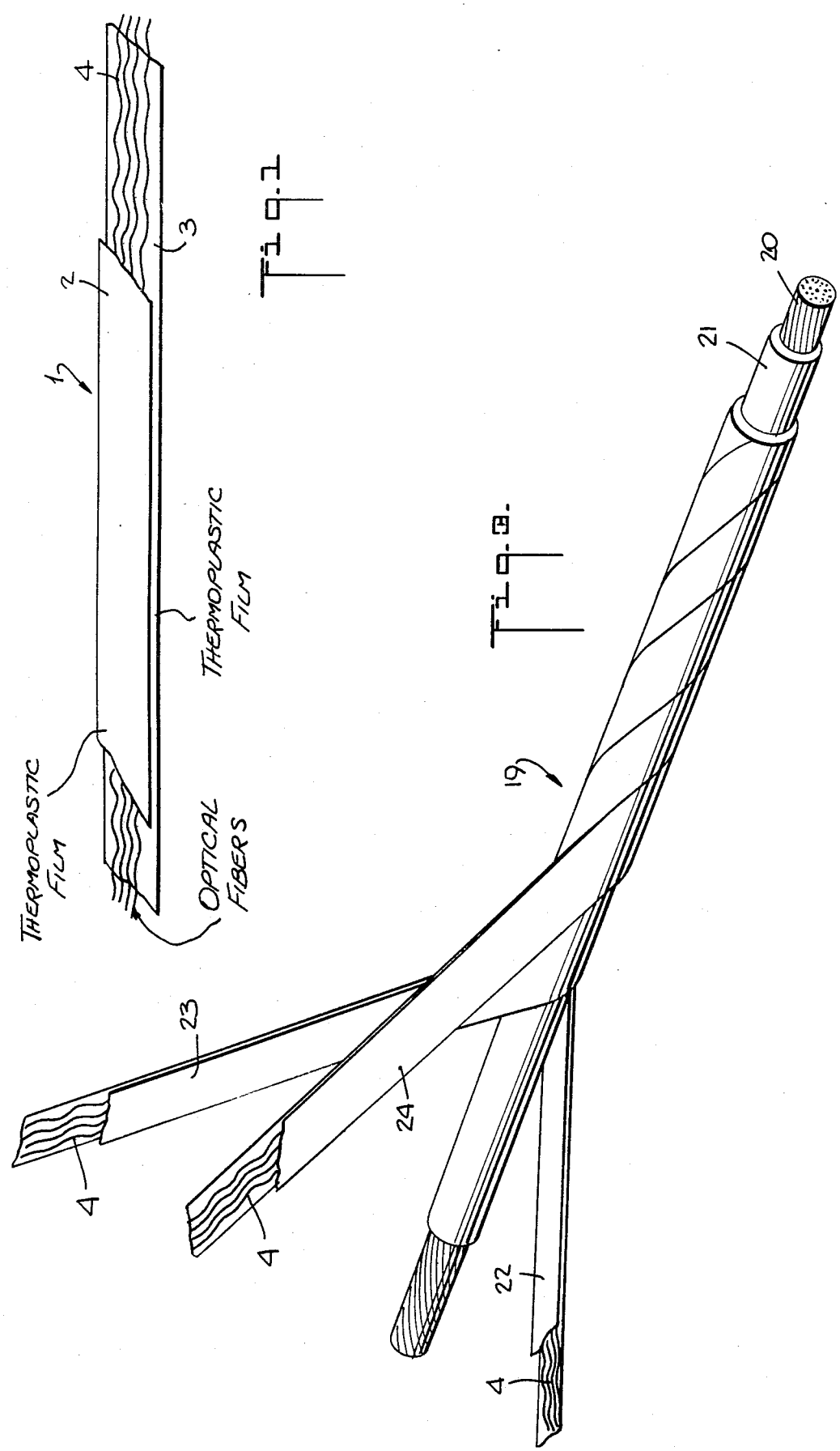

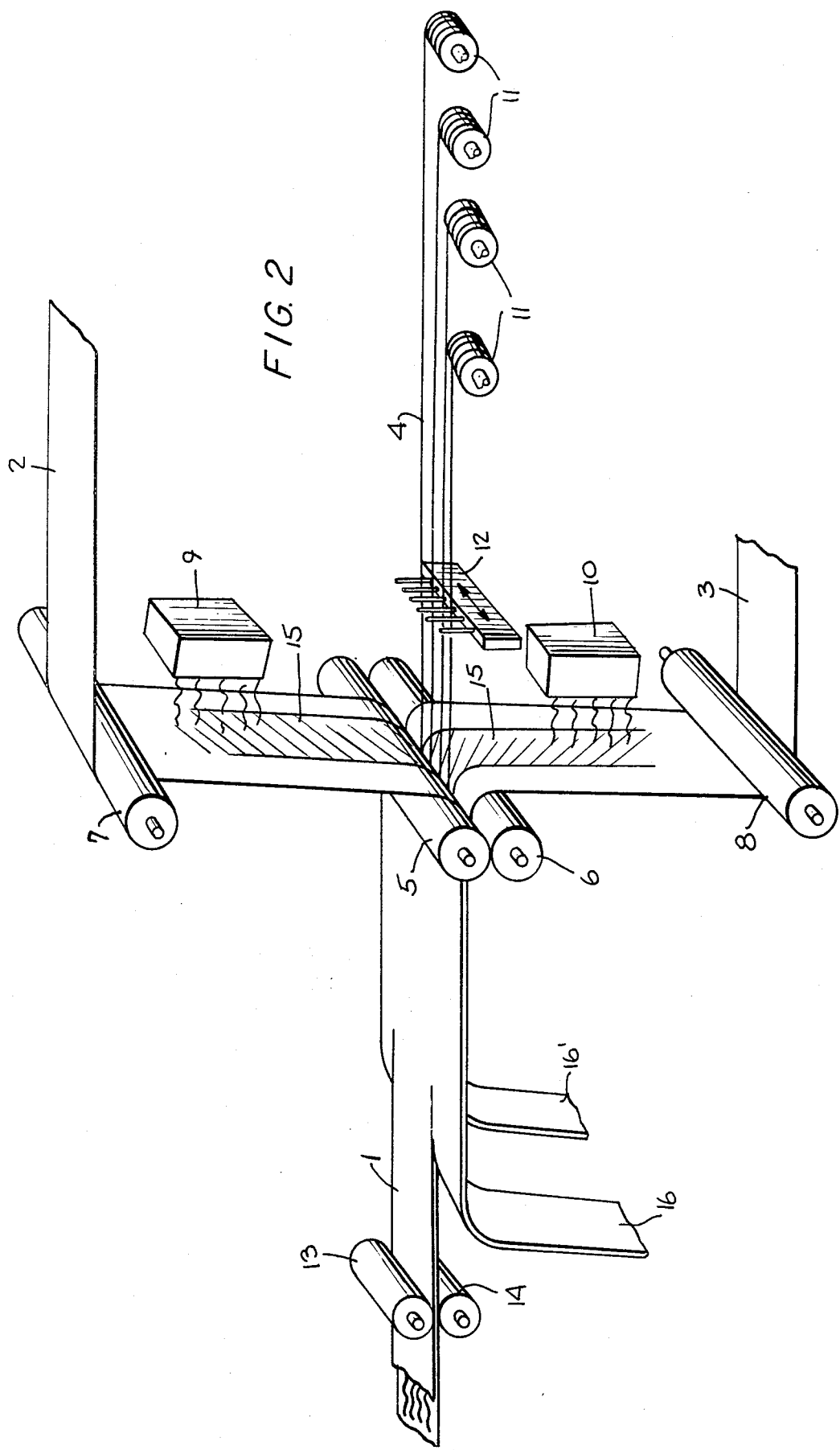

OPTICAL FIBER CABLE

The present invention relates to an optical fiber cable for transmitting signals and which is particularly useful as a telecommunication cable.

As is known in the art, optical fibers are fibers of glass or of synthetic plastic material, having a very small diameter, of the order of 0.1 to 0.01 mm., and comprise a tubular core and a sheath, the index of refraction of the sheath being smaller than that of the core, for example, from 1.50 to 1.52 as compared to 1.56 to 1.64 for the core. Owing to this difference in the index of refraction between the materials constituting the core and the sheath, light, entering one end of the fiber, is totally reflected inside the fiber itself and can be transmitted along the axis of the fiber, even if the fiber is curvilinear, as far as the other end of the fiber. By employing particular types of highly transparent glass, it has been possible to transmit the light from one end of the fiber to the other with very little attenuation.

Optical fibers of this type can be of interest also as a means for the transmission of signals in telecommunication systems. Their employment involves, however, some problems, chiefly deriving from the typical physical and mechanical properties of said fibers. In fact, it must be taken into account that although these fibers, which are extremely thin, can resist in a satisfactory way tension stresses applied thereto, such fibers have a low ultimate elongation, and are, therefore, brittle. It follows that, in order to use them in telecommunication cables, in which they are to be grouped together in a unit to constitute the means for transmitting signals, it is first of all necessary to solve the problems involved in distributing them uniformly and limiting the deformations and the stresses which can act on the fibers both during the cable construction and during its laying and service, in order to ensure that all of the fibers forming the unit may remain uninterrupted.

A further problem is the difficulty of being able to identify, in the transmission system formed by a unit of a plurality of fibers, the many incoming and outgoing ends, as is normally required in conventional telecommunication cables.

Applicants have discovered that it is possible to eliminate the hereinbefore described problems and thereby make it possible to use in an appropriate manner optical fibers as a means for transmitting signals in telecommunication systems.

Accordingly, one object of the present invention is to provide an optical fiber cable which is particularly suitable to be used as a means for transmitting signals in telecommunication systems, characterized in that it is of a predetermined length and comprises at least two bandshaped films of synthetic thermoplastic material between which is embedded a plurality of optical fibers in side-by-side relation, each fiber following an undulate path, the total length of which, that is, the length of the fiber when stretched so that it is rectilinear, has a value which does not exceed said predetermined length by more than 10% thereof, and hence, does not exceed the length of the band-shaped films by more than 10%. The resulting structure is a composite band of predetermined length comprising undulated optical fibers sandwiched between films of synthetic thermoplastic resin, and said films are sealed together.

The above-described composite band can contain a large number of optical fibers, preferably about 50 optical fibers. Since said fibers normally have a diameter ranging between 0.1 and 0.01 mm and the width of the band preferably is not greater than about 30 mm, the pitch of the undulate path of the optical fibers contained in the films of thermoplastic synthetic material, i.e., the number of undulations per unit length of the band, is not critical in obtaining the composite band of the invention. The pitch can be varied within wide limits, provided that the length of the undulate path of the fibers has a value of the order of magnitude set forth hereinbefore.

The composite band according to the invention permits the obtaining of a uniform distribution of the optical fibers, even if these are in large number. At the same time, by virtue of the undulate path of the fibers between the films forming the band and the elastic properties typical of said films, there is the advantage that, when the band, in the course of its application, is subjected to tension or bending stresses within the elastic limits of the films, the optical fibers are hardly stressed.

The optical fibers which are provided in a large number between the films to form the composite band preferably are light isolated from one another, in order to prevent the transmission of light in a fiber from being affected or disturbed by light emission coming from the adjacent optical fibers. To this end, the films forming the composite band are constituted by synthetic thermoplastic material loaded with a light absorbing material, such as carbon black.

The synthetic thermoplastic material forming the films can be polyethylene or other polyolefines, polyamides or polyesters or combinations of said materials in the form of laminated films.

A further object of the present invention is a process for building up the above-indicated composite band. Said process comprises the steps of:

— causing at least two films of synthetic thermoplastic material, preferably loaded with carbon black, to pass between at least one pair of facing cylinders, said films being previously heated in a continuous way, for a width corresponding to that of said composite band, to a temperature higher than the softening point of said synthetic thermoplastic material and said films reaching said pair of cylinders so disposed that their respective longitudinal planes of symmetry are coincident;

— supplying simultaneously to said pair of cylinders, a plurality of optical fibers in such a way that they are fed between said two films of synthetic thermoplastic material and are laid on one of such films, said optical fibers having previously been caused to pass through a comb-like device situated immediately before the pair of cylinders and having a to-and-fro movement transversely to the fibers, so that each of said optical fibers is arranged between said films in an undulate path;

— exerting a pressure, at least by means of said pair of cylinders, on said films having said optical fibers therebetween during their passage through the cylinders; and — collecting, after cooling if necessary, the so obtained composite band.

When the two previously heated films of synthetic thermoplastic material are pressed against each other during their passage between said cylinders, the optical fibers which arrive at the cylinders following an undulate path are embedded in such shape in the films. The temperature to which said films are previously heated is, as previously mentioned, higher than the softening point of the synthetic thermoplastic material of which they are made, in order to ensure a perfect sealing together of the films as a result of the pressure exerted by the cylinders.

In order to prevent undesirable stretching of the films during their passage between the cylinders, the band is initially formed, according to an alternative embodiment of the process of the invention, of films having a width greater than that of the final composite band to be formed, and the surfaces of the film are previously heated only at their central zones. Before collecting the so obtained composite band, the films, sealed together, are cut at their lateral portions to remove the excess film which is not required for the width of the final composite band.

According to a further alternative embodiment of the hereinbefore described process, the films have a width corresponding to that of the final composite band which it is desired to obtain, and each of said films is layered, at its surface opposite so that intended to be heated, with a so-called "supporting" film having the same length and made of a synthetic thermoplastic material, the softening point of which is higher than that of the material on which it is superimposed.

The preliminary heating to which the surface of the inner films are subjected is then carried out at a temperature lower than the softening point of the synthetic material forming the so-called "supporting" films. In this way the two-layered composite films which reach the pair of cylinders are appropriately prepared to embed the optical fibers and to be sealed together. At the same time they are sufficiently resistant, at the outer portion of the band being formed, to withstand tension stresses exerted on the latter and to prevent the occurrence of undue stretching of the films. In this case, the composite band is constituted by four films with the optical fibers disposed with one pair of films on one side thereof and with the other pair of films on the other side thereof.

The supporting films can be made of a synthetic thermoplastic material analogous to or different from that forming the films intended to embed the optical fibers provided that, as previously mentioned, said synthetic material of the supporting films has a softening point higher than that of the material constituting the inner films.

Since the supporting films have a mere mechanical sustaining function, they can be constituted by sheets of another material, for example, paper, coated with a releasing adhesive agent at their surface intended to come into contact with the films of synthetic thermoplastic material in which the fibers are embedded. At the end of the process, before the collection of the composite band, the supporting sheets may be removed so that the resulting band is constituted by only two plastic films in which the optical fibers are embedded. In other words, the final band is the same as the one obtained by following the first embodiment of the process according to the invention.

By means of the composite band built up and obtained as described, it is possible to provide an advantageous means for the transmission of signals in telecommunication cables. A further object of the present invention is, therefore, a telecommunication cable which comprises, for the transmission of signals, a plurality of composite bands of definite length as described hereinbefore.

In practice, said cable is obtained by winding several composite bands of the invention about a carrying element, for example, a metallic rope, which is previously covered with a layer of synthetic thermoplastic material loaded with carbon black. To facilitate the identification of the various incoming and outgoing ends, each of the composite bands in the cable is provided with at least one film of a predetermined color. As can be understood, it is then possible to indicate with suitable marks in each band the series of the optical fibers included therein.

The present invention will be better understood from the following detailed description of the preferred embodiments thereof, which description should be considered in conjunction with the accompanying drawings, in which:

FIG. 1 is a perspective view, partly broken away, of a composite band of the invention;

FIG. 2 is a diagrammatically perspective view of apparatus for building up the composite band in accordance with the invention; and FIG. 3 is a perspective view, partly broken away, of a telecommunication cable comprised of several composite bands of the invention.

FIG. 1 represents a composite band 1 constituted by the two films 2 and 3 of synthetic thermoplastic material, each having a thickness corresponding to a fraction of a millimeter in which a plurality of optical fibers 4, having an undulate path, are embedded.

FIG. 2 illustrates the various steps of the process for forming the composite band 1. The components of the band 1 pass between a pair of facing cylinders 5 and 6 where they are pressed together to form the band. The films 2 and 3, having a width greater than that of final composite band 1 to be obtained, are fed to cylinders 5 and 6 from rollers 7 and 8, respectively, and are heated immediately before their passage between said cylinders 5 and 6, for example, by means of two infrared heating devices 9 and 10.

The preliminary heating is effected only at the central portion 15 of the exposed surface of each film 2 and 3, for a width corresponding to that of the composite band 1 to be formed.

Simultaneously, the optical fibers 4, coming from reels 11, each of which carries one fiber, are fed to the cylinders 5 and 6. During their travel from the reels 11 to the cylinders 5 and 6, the fibers 4 are guided and arranged according to the undulate path which they are to take between the films 2 and 3 by means of a comb-like device 12, having an oscillatory or to-and-fro movement transversely to the fibers 4 and situated immediately before the cylinders 5 and 6.

The fibers 4, in their passage between the cylinders 5 and 6, are embedded in and between the films 2 and 3. The composite band which is formed at the outlet of the cylinders 5 and 6 passes through a further pair of cylinders 13 and 14, and is subsequently collected on conventional apparatus.

A conventional device, such as a shear (not shown), is located before the cylinders 13 and 14, and such device cuts the lateral portions 16 and 16' which are in excess of the desired width for the final band 1.

FIG. 3 illustrates a telecommunication cable 19, for transmitting signals, which is constituted by winding several composite bands around a supporting or carrying element 20. In particular, the carrying element 20 may be a metal rope, on which is applied a winding or layer 21 of a synthetic thermoplastic material loaded with carbon black. Three of the composite bands 22, 23 and 24 are wound around the layer 21. Each of said bands 22, 23 and 24 have the optical fibers 4 embedded therein in the way described in connection with FIG. 1.

It will be noted from the description heretofore given that the various aspects of the invention permit the solving of the main problems which arise in the employment of optical fibers as a means for transmitting signals by way of telecommunication cables. The arrangement of the fibers in the bands is, in fact, uniform, and, as previously indicated as possibly necessary, the bands can have marks or colors which allow easy identification, both of the series of bands in the cable 19 and of the series of individual optical fibers in an individual band. Thus, one film of the band 22 may have one color, one film of the band 23 may have a second color and one film of the band 24 may have a third color, which not only distinguishes the bands but also indicates the sequence of the fibers therein. If desired, the bands 22–24 may be surrounded by a further insulating or armoring layer or layers.

The arrangement of the optical fibers according to an undulate path within the composite bands offers, as stated, the advantage that the fibers are subjected to almost no tension and bending both during the preparation of the bands and the cable 19, and during the laying and the operation of the cable 19 itself.

Besides the hereinbefore mentioned advantages, mention can be made of the fact that the construction of a cable 19 for transmitting signals by means of a winding of composite bands ensures the flexibility of said cable, by virtue of the sliding permitted by the turns of the bands, one with respect to the other.

Although preferred embodiments of the present invention have been described and illustrated, it will be understood by those skilled in the art that various modifications may be made without departing from the principles of the invention.

What is claimed is:

1. A composite optical fiber band comprising at least a pair of films of synthetic thermoplastic material which are sealed together and have a plurality of light transmitting optical fibers embedded therebetween, said fibers following undulate paths, the lengths of which do not exceed the lengths of the films in which the fibers are embedded by more than 10 percent so that the fibers are subjected to little stress when the films are subjected to tension and bending stresses within the elastic limits of the films.

2. An optical fiber band as set forth in claim 1, wherein said fibers are in side-by-side relation, are between five and 50 in number and have a diameter between 0.01 and 0.1 millimeters and wherein said band has a width up to 30 millimeters.

3. An optical fiber band as set forth in claim 1, wherein said films contain carbon black.

4. An optical fiber band as set forth in claim 3, wherein said thermoplastic material surrounds each of said fibers.

5. An optical fiber band as set forth in claim 1, wherein said thermoplastic material is selected from the group consisting of polyolefines, fluorinated polyolefines, polyvinylchloride, polyamides, polyesters and mixtures thereof.

6. An optical fiber band as set forth in claim 1, wherein each of said films comprises a pair of layers of thermoplastic material, the outer layer of which has a higher softening temperature than the inner layer thereof.

7. A telecommunication cable comprising a plurality of composite optical fiber bands, each band comprising at least a pair of films of synthetic thermoplastic material which are sealed together and have a plurality of optical fibers embedded therein, said fibers following undulate paths, the lengths of which do not exceed the lengths of the films in which the fibers are embedded by more than 10 percent so that the fibers are subjected to little stress when the films are subjected to tension and bending stresses within the elastic limits of the films and an insulation covered carrying element having a tensile strength substantially greater than that of said films, said bands being wound around said carrying element.

8. A cable as set forth in claim 7, wherein said carrying element is covered by a layer of synthetic plastic resin containing carbon black.

9. A cable as set forth in claim 7, wherein at least one film of each band has a color different from the colors of the films of the remaining bands.

* * * * *